Figure 5:
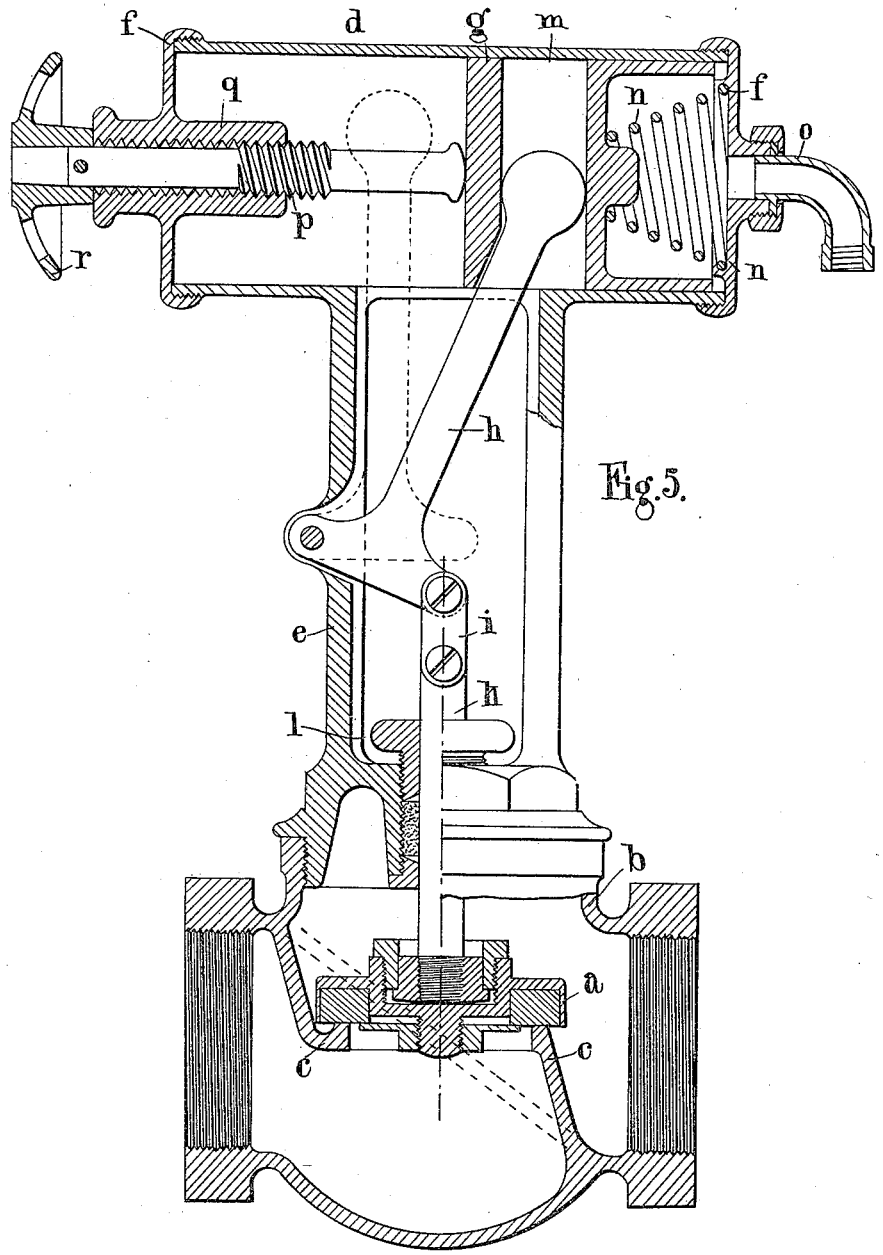

F. W. JENNINGS.
CONTROL VALVE.
APPLICATION FILED APR. 30, 1912.
1,106,454.
Patented Aug. 11, 1914.
3 SHEETS—SHEET 1.
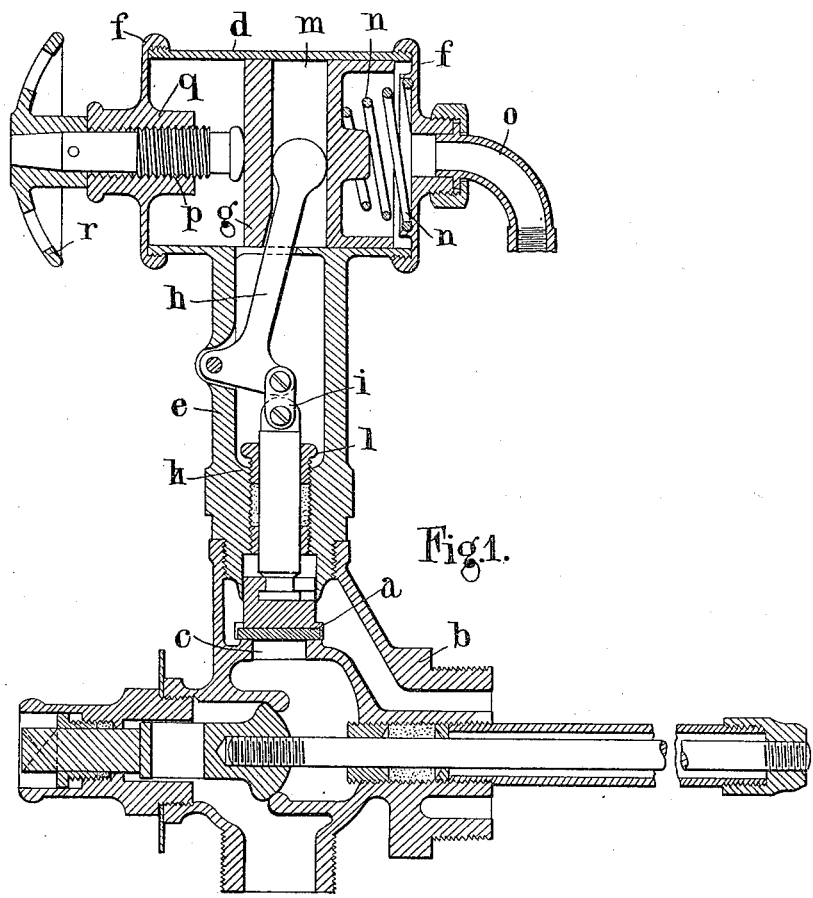
Fig. 1.
Fig. 4.
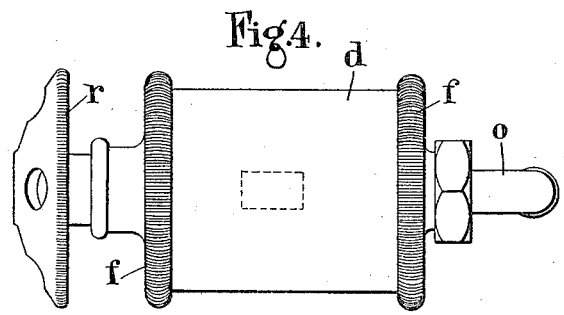
Witnesses
S. M. Baeder
M. M. Riemann
Inventor
F. W. Jennings
by
Dyer Smith
his Attorney.

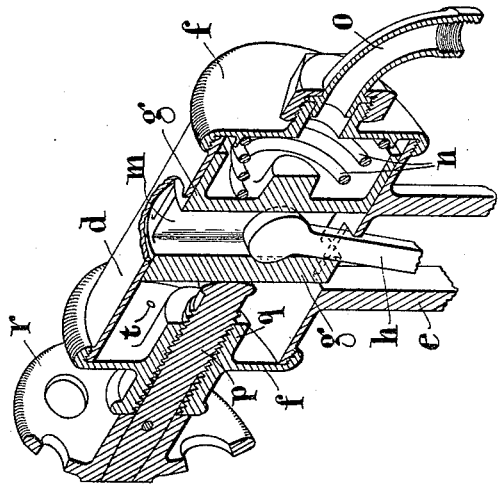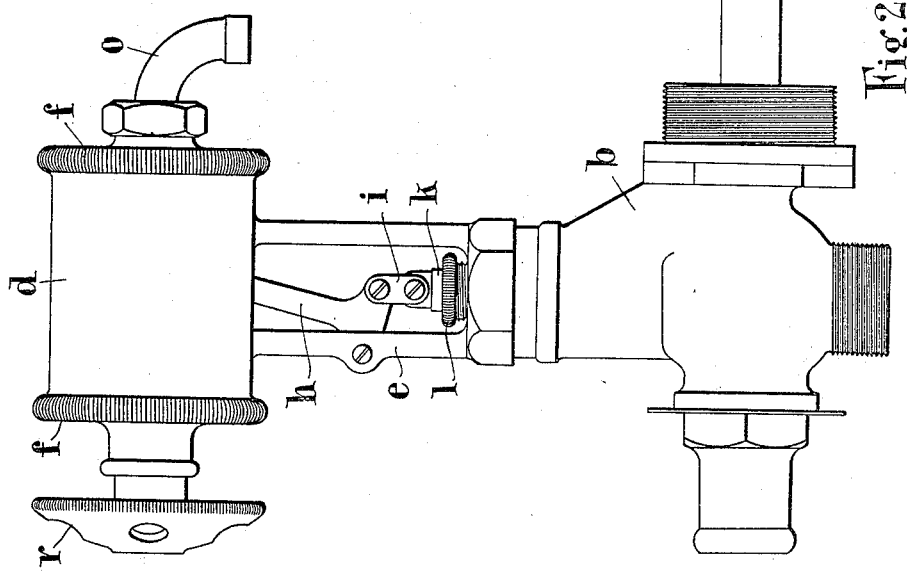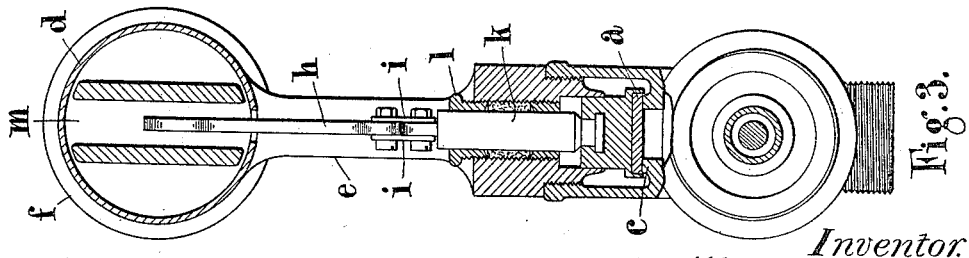

UNITED STATES PATENT OFFICE.

FREDERICK WILLIAM JENNINGS, OF LONDON, ENGLAND.

CONTROL-VALVE.

1,106,454.      Specification of Letters Patent.      Patented Aug. 11, 1914.

Application filed April 30, 1912. Serial No. 694,186.

*To all whom it may concern:*

Be it known that I, FREDERICK WILLIAM JENNINGS, a subject of the King of Great Britain and Ireland, and residing at 12 Great James street, Bedford Row, London, W. C., England, have invented certain new and useful Improvements in or Relating to Control-Valves, of which the following is a specification.

This invention relates to improvements in control valves such as are particularly, though not solely, applicable for use in connection with steam-heating systems, and the object of the invention is to provide a cheap and efficient valve of this kind which shall be simple in operation without at the same time possessing any parts liable to injury or deterioration due to any steam that may be allowed to escape when the valve has been subjected to wear or for any other reason.

The accompanying drawings illustrate three modes of carrying out my invention.

Figure 1 is a front sectional elevation showing my invention applied in one convenient manner to one type of valve. Figs. 2 and 3 are respectively a front elevation and cross-sectional elevation of the device shown in Fig. 1. Fig. 4 is a plan. Fig. 5 is a similar view to Fig. 1 showing my invention applied to a modified form of valve. Fig. 6 is a perspective view of a portion of the device shown in Fig. 1.

In carrying my invention into effect in one convenient manner as, for example, in its application to a stop or control valve for use in a steam or hot water-heating system or other systems requiring control, I locate the valve $a$ in any convenient valve body or casing $b$ and adapt it to coöperate with any usual and suitable form of valve seat $c$, although I may vary the construction and size of the casing and the form of valve seat to suit the type of valve to which my invention is to be applied and the particular purpose for which the apparatus is to be employed. Secured to or supported upon the valve casing $b$ in any convenient manner is a short cylinder $d$ having its axis arranged at right angles or any other convenient angle to the direction of lift of the valve and carried upon a tubular standard or upon posts or brackets $e$ which may be attached to the cylinder in any suitable manner or may be formed integral therewith. Within the cylinder $d$, which may be conveniently provided with a removable cap or cover $f$ at each end, is a piston, $g$ adapted to work air-tight within the cylinder and by its movement to operate the valve $a$ in the valve casing. In one convenient method of effecting this I pivotally mount upon the bracket $e$ supporting the cylinder a bell-crank lever $h$, one arm of which is connected by means of links $i$ or other suitable connecting members to the valve stem $k$, which is packed by means of any usual form of gland $l$, while the other end engages in a slot $m$ formed in the piston $g$ above referred to or with guides secured to the piston, the end of the bell-crank lever engaging with such slot or guides being preferably formed rounded or provided with a roller or other convenient antifriction device for the purpose of minimizing friction. The arrangement is such that while the valve is normally held in its raised or open position by means of a spring $n$, it will be positively closed through the medium of the piston and the linkage connecting the piston with the valve stem upon the application of pressure to one end of the piston although the piston may equally well be caused to move in the cylinder under the action of a vacuum in order to close the valve, the latter arrangement being illustrated in the drawing where the exhausting appliance is connected to the cylinder by the pipe connection.

If desired I may provide hand-operated means for closing the valve when required, such means conveniently taking the form of a threaded spindle $p$ adapted to be rotated in a fixed nut carried by one of the end plates of the cylinder or in a threaded bush $q$ formed integral therewith and bearing at its inner end against the end of the piston so that when the threaded rod is rotated by means of a convenient hand-wheel $r$ or lever the piston is forced in against the action of the spring $n$ whereby the valve is positively closed. For the purpose of facilitating the movement of the piston within the cylinder a small air-leak $t$ is formed at one end of the cylinder or in the cap or cover protecting that end for the purpose of allowing the ingress and egress of air according as the piston is moved in one direction or the other.

Fig. 5, in which like parts to those above described are given similar reference letters, shows the application of my invention to a modified form of valve and the construction and operation of this device will be clear from the foregoing description.

It is to be understood that I may suitably modify and vary the various details of construction and the arrangement of parts and other details such as the proportionate areas of the piston and the valve and the relative lengths of the lever or levers (seeing that a compound system of leverage may be employed when required) forming the linkage connecting the operating piston with the valve to suit any particular requirements depending upon the type of system or valve to which my invention is to be applied or the heating medium which is to be employed in the system, and it will also be clear that my improved form of valve may be readily employed in systems in which the various control valves are operated from a central position at any distance from the valves.

Having now described my invention what I claim as new and desire to secure by Letters Patent is:—

A controlling valve for heating systems or for like purposes comprising a valve, a casing therefor, a bracket mounted upon said casing a cylinder mounted upon said bracket, a bell crank lever pivotally mounted upon said bracket, links adapted to connect one end of the bell crank lever with said valve, a piston working in said cylinder, said piston being provided with a transverse head within which the free end of the bell crank lever is adapted to slide, and hand-operated means for controlling the movements of said piston when required.

This specification signed and witnessed this 17th day of April, 1912.

FREDERICK WILLIAM JENNINGS.

Witnesses:
W. WARREN GRIGGS,
R. A. OUTHWAITE.

---

Copies of this patent may be obtained for five cents each, by addressing the "Commissioner of Patents, Washington, D. C."